United States Patent [19]
Auvil et al.

[11] Patent Number: 5,775,378
[45] Date of Patent: Jul. 7, 1998

[54] FLUID CONDUIT SYSTEMS AND METHODS FOR MAKING

[75] Inventors: Andrew L. Auvil, Brecksville; Fred Brannan, Akron; Girish Trikamal Dalal, Avon Lake; Thomas L. Evans, Amherst, all of Ohio; George G. Meyer; Stephen J. Meyer, both of Malvern, Pa.; Carmine L. Schiavone, Royersford, Pa.; Theodore Joseph Schmitz, Avon, Ohio

[73] Assignees: Central Sprinkler Company, Lansdale, Pa.; The B. F. Goodrich Company, Akron, Ohio

[21] Appl. No.: 552,295

[22] Filed: Nov. 2, 1995

[51] Int. Cl.$^6$ ............................................. F16L 7/14
[52] U.S. Cl. .................... 138/143; 138/109; 138/145; 285/21.1; 285/915
[58] Field of Search ......................... 138/139, 143, 138/140, 137, 145, DIG. 1, 109; 283/915, 21.1–21.3

[56] References Cited

U.S. PATENT DOCUMENTS

| | | | |
|---|---|---|---|
| 3,734,191 | 5/1973 | Johnson et al. | 169/5 |
| 3,823,045 | 7/1974 | Hielema | 156/244 |
| 4,216,802 | 8/1980 | Bonnes et al. | 138/143 |
| 4,484,877 | 11/1984 | Stucke et al. | 425/113 |
| 4,606,953 | 8/1986 | Suzuki et al. | 138/143 X |
| 4,784,409 | 11/1988 | Piechowiak | 285/21 |
| 4,828,557 | 5/1989 | Persidsky | 604/408 |
| 4,888,148 | 12/1989 | Hartitz | 264/209.5 |
| 4,904,323 | 2/1990 | Naudeau | 156/203 |
| 4,997,214 | 3/1991 | Reese | 285/174 |
| 5,437,481 | 8/1995 | Spears et al. | 285/174 |

FOREIGN PATENT DOCUMENTS

| | | |
|---|---|---|
| 629 307 B | 1/1992 | Australia . |
| 0 643 116 A | 3/1995 | European Pat. Off. . |
| 22 46 496 A | 5/1973 | Germany . |
| 85 04 719 U | 7/1985 | Germany . |
| 22 55 084 B | 1/1995 | Germany . |
| 195 09 937 C | 2/1996 | Germany . |
| 1 227 163 | 4/1971 | United Kingdom . |

*Primary Examiner*—Patrick F. Brinson
*Attorney, Agent, or Firm*—Panitch Schwarze Jacobs & Nadel, P.C.

[57] ABSTRACT

Multilayer fluid conduits are formed by adhering to a tubular outer surface of a metal pipe, a thermoplastic outer layer. The outer layer permits ends of the multilayer conduit to be joined together in leak-proof fluid conduit systems simply by adhering the conduit ends with compatible thermoplastic fittings. For fire protection systems, the preferred metal is steel, the preferred thermoplastic is CPVC and the preferred adhesive is heat activated. The adhesive coated metal pipe is preheated and the CPVC is extruded onto the outer surface of the heated metal pipe. Through the use of fire resistive CPVC, the multilayer conduit systems of the present invention can be installed in more severe fire threat areas than can existing, all plastic piping, including all CPVC piping systems. The conduit is assembled into systems on site simply by cutting and direct bonding with ordinary, all plastic fittings using appropriate bonding agents such as solvent based adhesives. CPVC fittings are preferred for fire protection systems.

33 Claims, 5 Drawing Sheets

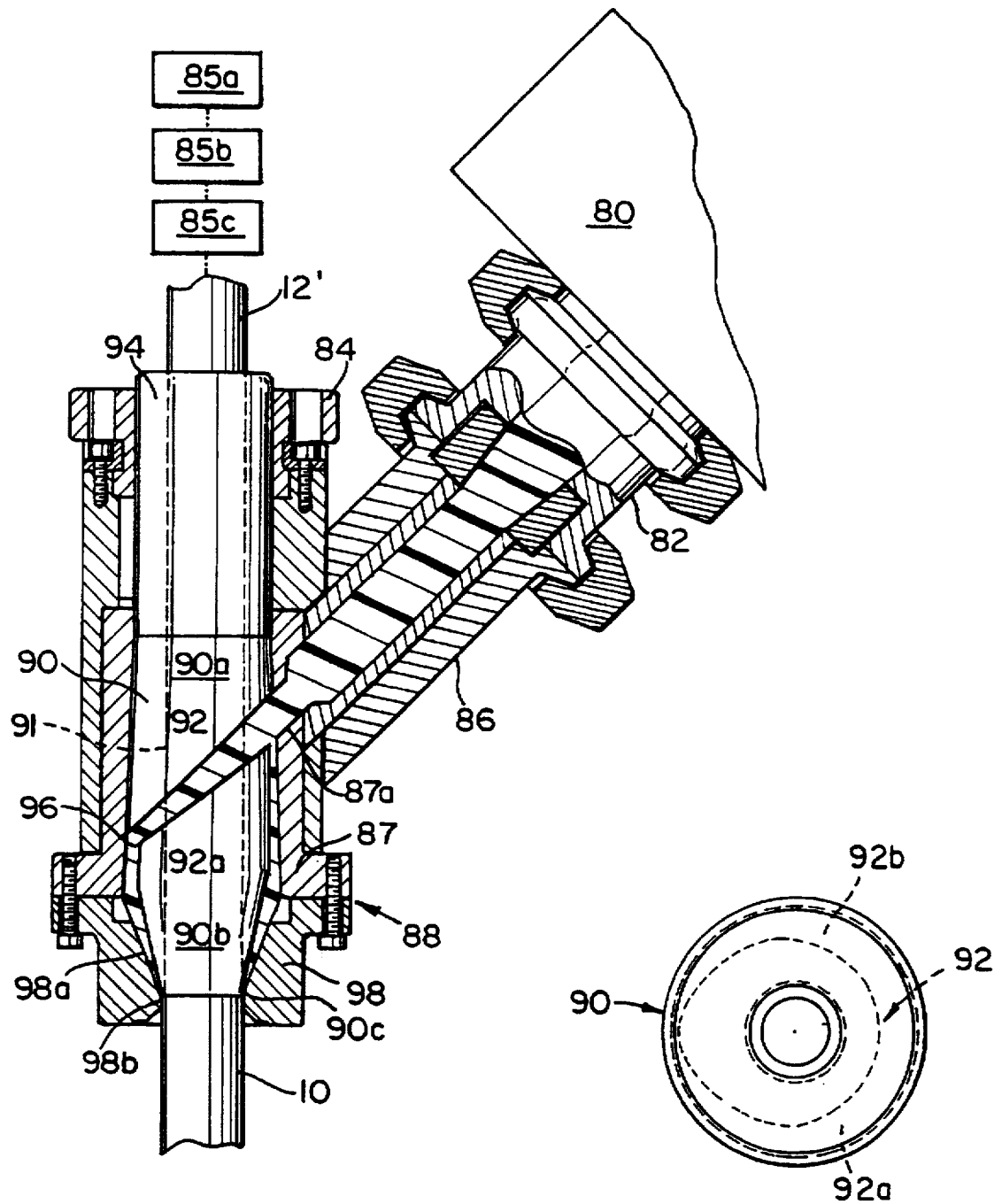

FLUID CONDUIT SYSTEMS AND METHODS FOR MAKING

FIELD OF THE INVENTION

The present invention relates to fluid conduit systems, particularly those suitable for use in fire sprinkler and nozzle systems.

BACKGROUND OF THE INVENTION

Sprinkler system installers typically use metal conduit, either copper or more commonly iron or steel pipe, as supply lines in automatic sprinkler systems. Such metal lines obviously resist fire and temperature damage better than other structural materials that might be used.

Each metal has relative cost advantages and disadvantages. Typically, piping is provided in fixed lengths and must be cut to size prior to installation. Ferrous pipe was then typically threaded in the field and mated with a threaded coupling. The use of threaded couplings in ferrous piping adds significantly to the labor costs of installing such systems. Copper tubing installs more quickly than ferrous pipe as the cut lengths of copper can simply be slip-mated with appropriate fittings and then soldered. However, copper is quite expensive in material cost compared to ferrous pipe.

Other types of non-threaded mating systems have been developed for metal particularly steel pipe. For example, crimping systems are known in which crimpable fittings can be used to join small diameters of the lightest Schedule 5 steel piping. Other types of mechanical, compression type fittings are known which sealingly mate with the exterior ends of grooved piping. Still other types of mechanical joining systems employ a tubular insert positioned in each open end of a pair of adjoining piping members and an external compression fitting which is applied over the ends and the insert to compress the ends against the insert. Such systems require either the mechanical shaping and disruption of the smooth, cylindrical ends of the piping by the addition of grooves, flanges or the like and/or the use of unique and typically expensive compression fittings.

Certain plastics have gained acceptance for use in residential and, to some extent, light hazard fire sprinkler systems. Chlorinated polyvinyl chloride (CPVC) plastic piping and fittings have been listed by Underwriters Laboratories. One listed CPVC compound is BLAZEMASTER® brand CPVC of The B. F. Goodrich Co., Cleveland, Ohio. BLAZEMASTER® is a registered trademark of The B. F. Goodrich Co. Underwriters Laboratories has also listed Flameaway brand CPVC pipe and fittings distributed in the United States by Flameaway Plastics, Inc. of Beverly Hills, Calif. Underwriters Laboratories also lists certain polybutylene sprinkler pipe and fittings for use in residential and light hazard fire sprinkler systems.

Piping made from plastic has proved to be less expensive in material cost than copper while installation costs have been comparable to copper. Similar steps are involved in joining together both types of plastic and copper pipe. However, plastic piping is more flexible than metal piping. Support must be provided more frequently with plastic piping than with metal piping and more frequently with polybutylene than with CPVC. This can add sufficiently to both the material costs and the labor costs of installed plastic piping systems to actually raise the total costs of such plastic systems above the costs of metal systems in some installations. Plastic piping for sprinkler systems finds use primarily in residential installations where the plastic pipe can be more easily installed through misaligned openings and through and/or around rafters and joists than can metal piping.

According to recent industry figures, residential sprinkler heads account for about fifteen per cent of all sprinkler heads sold. However, because of the greater size of piping and more expensive sprinklers typically used in light and ordinary hazard installations, the actual dollar value of the residential sprinkler market is estimated to be only about ten per cent or less of the total dollar market for residential, light and ordinary hazard sprinkler installations.

Hybrid plastic/metal piping and couplings have been proposed for fluid conduit systems for many years.

For example, U.S. Pat. No. 5,143,407 to Cokeh refers to a proposal to use copper tubing coated with polyvinyl chloride (PVC) for protection against denting and discloses a variety of copper fittings partially coated with PVC for the formation of joints between the ends of lengths of such multilayer conduit. Cokeh does not indicate how such composite tubing is or could be made or if it has been made. The tubing is joined with the fittings by suitable plastic adhesive applied to the plastic outside surface of the conduit, which bonds to the PVC sleeve formed around the metal tube portion of the coupling. Compression fit is also described for securing the pipe ends to the coupling. However, in each instance, the use of resilient washers is disclosed to provide a leak-proof fluid seal. This is required because PVC does not bond to the copper.

Other types of plastic coated pipe have been proposed for other purposes. For example, U.S. Pat. No. 3,502,492 discloses the electrostatic deposition of a light dusting of an epoxy resin upon the surface of a metal substrate like the outer surface of a metal pipe, the electrostatic deposition of PVC resin particles upon the surface in a heavier layer and the heating of the substrate to coalesce the PVC and epoxy resins to form a PVC layer adhered to the surface of the substrate. Physical structure of the pipes or their joints are not discussed.

U.S. Pat. No. 4,481,239 discloses a process for coating metallic substrates such as iron pipe in which one or more crosslinking resins are applied to the pipe surface and heated sufficiently to crosslink and an olefin polymer is applied to the heated, coated substrate as an outer layer. Structures of the pipe or their joints are not discussed.

U.S. Pat. No. 2,646,822 discloses the use of polyethylene (PE) or polystyrene as a corrosion resistant external coating for metal pipes. In the only examples shown in that patent, the PE coated metal pipes were provided with plastic-free, conventionally threaded ends. The ends are shown being received in plastic-coated, metal couplings with plastic-free, internal metal threads to provide continuous lengths of plastic-coated metal pipe. Coupling at the joint is provided by mechanical engagement of threads on the outside end of the pipe with the threads inside the metal tubing of the coupling. There is no indication whether the plastic layer is adhered to the pipe.

SUMMARY OF INVENTION

In one aspect, the invention is a multilayer fluid conduit system comprising: a hollow conduit formed by a hollow length of metal pipe having a pair of opposing open ends defined by a completely closed tubular outer surface, the open ends of the pipe defining open ends of the conduit, a layer of thermoplastic completely covering the tubular outer surface of the pipe and an adhesive layer between the metal pipe and the thermoplastic layer distributed to provide a circumferential leak-proof seal between the metal pipe and the thermoplastic layer at least at the open ends of the conduit; and a fitting mounted on one open end of the conduit, the fitting including at least one open end receiving and overlapping the open end of the conduit, the one open end of the fitting having an exposed, innermost tubular surface of thermoplastic directly facing and bonded to the thermoplastic layer on the one open end of the conduit.

In yet another aspect, the invention is a method of making the aforesaid fluid conduit system comprising the steps of: applying an ambient temperature acting bonding agent to at least one of the thermoplastic layer exposed on the one open end of the conduit and the exposed, innermost tubular surface of the fitting; and maintaining the conduit and the fitting together with the open end of the fitting receiving and covering the one end of the conduit until the bonding agent forms the leak-proof sealed joint directly between the conduit and the fitting.

DETAILED DESCRIPTION OF THE DRAWINGS

The foregoing summary as well as the following detailed description of preferred embodiments will be better understood when made in conjunction with the appended drawings. For the purpose of illustrating the invention, there is shown diagrammatically in the drawings, embodiments which are presently preferred. It should be understood, however, that the invention is not limited to the specific embodiments, instrumentalities, elements and methods disclosed in the drawings which are diagrammatic:

FIG. 10 depicts schematically, in cross-section, an extrusion head for applying a layer of CPVC resin to the adhesive covered outer surface of a ferrous pipe;

FIG. 11 depicts schematically an end view of the extrusion pin of the extrusion head of FIG. 10.

DETAILED DESCRIPTION OF PREFERRED EMBODIMENTS

Figure 1:
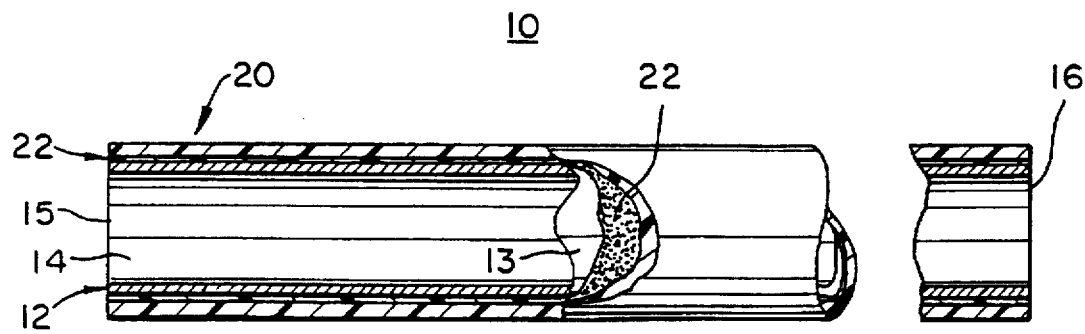
FIG. 1 is a partially broken away length of multilayer conduit according to the present invention.

Certain terminology is used in the following description for convenience only and is not intended to be limiting. The words "right", "left", "lower" and "upper" designate directions in the drawings to which reference is made. The words "radial" and "axial" refer to directions perpendicular to and along the central axis of an object, element or structure referred to or other designated axis. The words "inwardly" and "outwardly" refer to directions towards and away from, respectively, the geometric center of the object, element or structure. The terminology includes the words above specifically mentioned, derivatives thereof and words of similar import. Moreover, throughout the drawings, like numerals are used to indicate like elements.

FIG. 1 depicts diagrammatically an exemplary multilayer fluid conduit of the present invention indicated generally at 10. Conduit 10 is formed by a length of hollow metal pipe 12 having a completely closed, tubular outer surface 13 and an opposing closed tubular inner surface 14. The multilayer fluid conduit 10 further includes a preferably uniformly thick thermoplastic layer 20 which preferably at least essentially completely covers the closed, tubular outer surface 13 of the ferrous metal pipe 12 from one end 15 to an opposing end 16 of the pipe 12 and conduit 10. An adhesive layer 22 is provided between the metal pipe 12 and the thermoplastic layer 20, bonding the thermoplastic layer with the outer tubular surface 13 of the metal pipe 12. The tubular inner and outer surfaces 14 and 13 of the metal pipe 12 are, in this embodiment, uniformly smooth (within manufacturing tolerances) from end 15 to end 16 and provide uniform inner and uniform outer diameters to the ferrous metal pipe 12 from one end of the pipe 15 to the other end 16.

Figure 2:
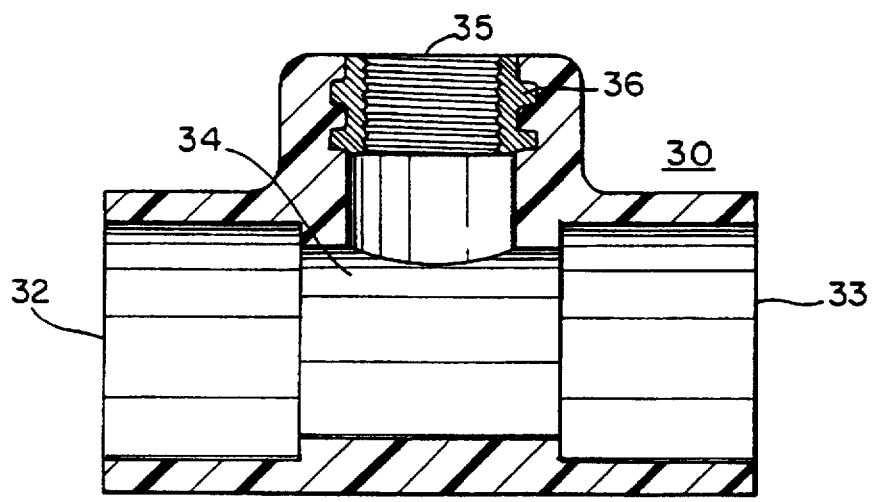
FIG. 2 is a cross-section of an exemplary plastic pipe fitting.
Figure 3:
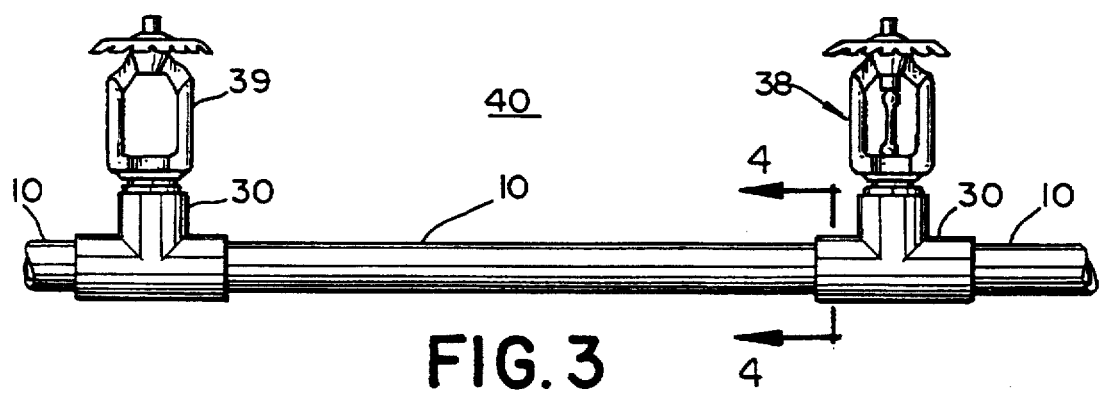
FIG. 3 is a side elevation of part of an automatic ceiling sprinkler system utilizing multilayer conduits and fittings of FIGS. 1 and 2.

FIG. 2 depicts diagrammatically one fitting 30 of a variety of fittings which may be used with the multilayer fluid conduit 10 to assemble multilayer fluid conduit systems of the present invention like the system indicated generally at 40 in FIG. 3.

Returning back to FIG. 2, fitting 30 is a conventional, "tee" shaped sprinkler head adaptor. Fitting 30 includes an integral, thermoplastic body with first and second opposing tubular open ends 32 and 33. The tubular open ends 32, 33 are connected by a central tubular branch section 34 having a third tubular open end 35. A metallic insert 36, internally threaded to receive the threaded end of a fire sprinkler or nozzle or other complementary threaded member, is preferably molded into the fitting body to form the internally threaded opening of the third open end 35. The exposed, innermost tubular surfaces of the tubular open ends 32 and 33 are thermoplastic and again preferably uniformly smooth and of a constant inner diameter.

FIG. 3 depicts diagrammatically a portion of a fire protection system 40 utilizing multilayer fluid conduits 10 of the present invention. The portion of the multilayer fluid conduit system depicted in FIG. 3 is provided by a plurality of the multilayer fluid conduits 10, connected together, end to end, by a plurality of the tee fittings 30. Hollow ends of adjoining lengths of the multilayer conduits 10 are received in each of the opposing first and second open ends 32 and 33 of each tee fitting 30. The tubular opening 35 of each tee fitting 30 receives the threaded end of a conventional fire sprinkler 38 or nozzle 39. A fire sprinkler 38 would have a plug and triggering mechanism holding the plug in place until released. A fire nozzle would be similar to a sprinkler but would lack a plug and triggering mechanism. It may even lack a deflector and achieve a water distribution pattern by special shaping of its orifice.

Figure 4:
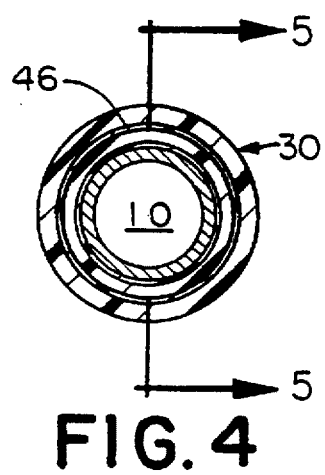
FIG. 4 is a cross-sectional view taken along the lines of 4—4 of FIG. 3.
Figure 5:
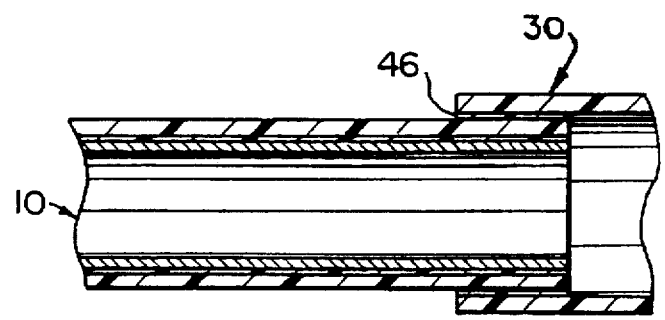
FIG. 5 is a cross-sectional view taken along the lines 5—5 of FIG. 4.

As is best seen in FIGS. 4 and 5, the outer thermoplastic layer 20 of each conduit 10 is bonded at 46 to the exposed innermost tubular surface of one of the tubular open ends 32 or 33 of the thermoplastic fitting 30 (or another suitable fitting) to form a sealed joint between the conduit 10 and fitting 30. It should be noted that the central branch section 34 defines an exposed, thermoplastic inner tubular surface section of the conduit system 40.

In addition to being joined by thermoplastic fittings like the fitting 30, it will be appreciated that according to the present invention, the multilayer conduit 10 can be connected or otherwise combined using other fittings of standard configuration which are currently used with all-CPVC piping for fire protection systems and with other plastic conduit systems for other uses. These include but are not limited to other forms of sprinkler adapters, straight couplings, elbows, bushings, crosses, caps, plugs, flanges, grooved coupling adapters, and unions, each with slip, spigot or slip and spigot style ends and reduction or uniform internal diameters.

In the preferred embodiment of system 40 configured for fire protection, metal pipe 12 of conduit is of ferrous material, preferably steel. The thermoplastic layer 20 is preferably of a fire protection rated chlorinated polyvinylchloride (CPVC) such as BLAZEMASTER® brand CPVC of The B. F. Goodrich. The adhesive layer 22 is one which permanently bonds the CPVC layer 20 to the outer surface 13 of the ferrous metal pipe 12 and can adapt to the different coefficients of thermal expansion of the steel and the CPVC to maintain the bond. The fittings 30 and like fittings for fire protection systems are preferably of a fire protection rated CPVC such as BLAZEMASTER® brand CPVC with brass threaded inserts 36 and are currently available today from various commercial sources including Central Sprinkler Co. of Lansdale, Pa.

The use of CPVC, in particular, is an important aspect of the preferred embodiment of the invention in several respects. In terms of fire protection systems, only CPVC and polybutylene have passed industry standards for fire safety and thus are the only plastics that can be used currently for fire protection conduit systems in virtually all locals which permit the use of plastic in such systems. However, polybutylene systems have lower maximum ambient operating temperatures (120° F. versus 150° F. for CPVC), are more flexible than CPVC and require the provision of heat bonded mechanically crimped joints. Polybutylene heat bonded joints have been proven to be prone to failure after extended thermal cycling. CPVC can be bonded directly to CPVC to form leakproof joints at ambient temperatures of from about 0° F. to 100° F. or more with known, solvent based bonding agents. CPVC can be installed with fewer support hangers and in locations with higher ambient temperatures and with less structural protection than can polybutylene. Among plastics commonly molded or extruded, CPVC is one of the most difficult to work with. Extrusion temperatures for CPVC polymers range generally from between about 400° to about 450° F. However, extrusion temperature ranges for particular extrusion equipment and CPVC formulations may have much narrower ranges, i.e. only about 10°–20° F. For example, the BLAZEMASTER® brand CPVC compound has a preferred extrusion temperature range of only between about 415° to 430° F. in the extrusion layout to be described.

The CPVC preferred for extrusion is the conduit outer layer 22 is The B. F. Goodrich Co. BLAZEMASTER® No. 88745 compound. Physical and thermal characteristics of that CPVC compound are as follows:

| Property | BLAZEMASTER® Brand CPVC | ASTM |
|---|---|---|
| Specific Gravity "Sp. Gr." | 1.55 | D792 |
| IZOD Impact Strength (ft. lbs./inch, notched) | 1.5 | D256A |
| Modulus of Elasticity, @ 73° F., psi "E" | $4.23 \times 10^5$ | D638 |
| Compressive Strength, psi "o" | 9,600 | D695 |
| Poisson's Ratio "O" | .35–.38 | — |
| Working Stress @ 73° F. psi "S" | 2,000 | D1598 |
| Hazen Williams Factor "C" | 150 | — |
| Coefficient of Linear Expansion in/(in °F.) "e" | $3.4 \times 10^{-5}$ | D696 |
| Thermal Conductivity BTU/hr/ft²/°F./in "k" | 0.95 | D177 |
| Flash Ignition Temperature "°F." | 900 | D1929 |
| Limiting Oxygen Index "LOI" | %60 | D2863 |
| Electrical Conductivity | Non Conductor | |
| Extrusion Temperature (approx.) | 414–425° F. | N/A |
| Heat Distortion Temperature "°F." | 217° F. | — |

Further information about CPVC resins used in BLAZEMASTER® No. 88745 CPVC compound is provided in U.S. Pat. No. 4,412,898 which is incorporated herein in its entirety.

Very thin, cold rolled steel, for example SAE C1010 twenty gauge steel, is presently preferred for the ferrous metal pipe 12 of the multilayer conduit 10 of the present invention as it offers cost benefits not found in other metals. Other ferrous metals that might be used include galvanized steel, stainless steel or a steel with higher carbon values than C1010 to minimize wall thickness through increased strength.

Adhesion of the preferred CPVC material with the ferrous pipe 12 is necessary as CPVC will not directly bond to metal even when extruded in a melted form onto the metal. Adhesive layer 22 is provided to prevent the likelihood of water wicking between the metal pipe 12 and the CPVC outer layer 20 covering the pipe 12 when the conduits 10 are connected together into a fluid conduit system. The adhesive layer 22 further is also sufficiently elastic to accommodate the different thermal expansion coefficients of the metal pipe 12 (about 6 to $7 \times 10^{-6}/F.°$) and CPVC outer layer 20 (about $3.4 \times 10^{-5}/F.°$) to prevent failure of the bond between the CPVC and the ferrous pipe in use. If the conduit 10 is to be capable of being cut to any length for use, the adhesive layer must extend entirely around and entirely along the pipe 12 from end to end. A series of separate, individual adhesive rings might be provided along the pipe but a continuous adhesive layer running the entire length of the pipe completely around the pipe is much preferred for versatility. If the conduit 10 is to be used without further cutting, it is only necessary to provide an adhesive layer around either end of the pipe 12 extending away from the pipe end a distance sufficient to create an enduring waterproof seal between the pipe 12 and CPVC layer 20 around each of the ends of the pipe 12.

Preferred bonding materials for the aforesaid steel pipe and BLAZEMASTER® brand CPVC compound are The B. F. Goodrich Co. Adhesive No. A1718B and a two part system, Chemlok® 485 and Curative 44, of the Lord Corporation, Elastomer Products of Erie, Pa.

The B. F. Goodrich Co. A1718B is considered a solvent based primer. It is a liquid which includes a proprietary mix of methyl ethyl ketone, toluene, butyl alcohol, ethanol and isopropyl alcohol, and propylene oxide.

The Chemlok® 485/Curative 44 ingredients constitute a two component elastomeric adhesive. The Chemlok® 485 includes xylene, methyl ethyl ketone and ethyl benzene in a proprietary combination the Chemlok® Curative 44 includes xylene, aromatic polyisocyanate, 4,4'-diphenylmethane diisocyanate, ethyl benzene and diphenylmethane diisocyanate in a proprietary combination. The two are mixed in suggested proportions of 100 parts by weight Chemlok® 485 with 6–10 parts by weight Curative 44.

Each is preferably sprayed on the outer surface 13 of the pipe 12 without dilution in an amount sufficient to yield a thickness of about two to three mils when dry.

Preferably, multilayer conduit 10 is provided in outer diameters conforming to nominal piping or tubing outer dimensions, e.g. Schedules 40 and/or 80 (ASTM F438) to be used with nominally sized fittings. All thicknesses of the metal pipe 12, thermoplastic layer 20 and adhesive layer 22 of the multilayer conduit 10 would be only sufficiently thick to provide the strength and rigidity needed for a safe, leak-proof conduit system for the use or uses to which such conduit system is applied.

Outer diameters of the multilayer conduits 10 preferably will be conventional corresponding to the outer diameters of nominal pipe size (NPS) piping or tubing, e.g. from three-quarters of an inch to at least four inches in diameter, for use with corresponding, nominally sized fittings. ASTM Schedule 40 and Schedule 80 fittings are standard sizes for plastic used in fire protection conduit systems. Plastic fittings for use with plastic piping or tubing having nominal sizes of about two inches or less can be used in fire protection systems with Schedule 40 dimensions (ASTM F438), although Schedule 80 dimensions (ASTM F439) with heavier walls may also be used. A plastic fitting for use with plastic piping or tubing having a nominal pipe size of more than two inches must conform to Schedule 80 dimensions for fire protection system use. Other standard dimensions for pipes and fittings might be used for other uses of the conduit system. For example, standard ASTM pipe and fitting schedules range from Schedule 5 to Schedule 100 in size.

At least for fire protection conduit systems, the preferred CPVC layer 20 is provided in a wall thickness of less than 0.1 inch, suggestedly less than 0.08 and preferably of only about 0.04 inches although thicknesses as thin as about 0.020 inch and as much as 0.075 inch are also being contemplated for this use.

For fire sprinkling systems, the ferrous pipe 12 of the multilayer fluid conduit 10 preferably is very thin cold rolled steel having a wall thickness of less than 0.1 inch, suggestedly less than 0.08 inch and even 0.06 inch and preferably approximately only about 0.04 inch (e.g. 0.042 inch), although thicknesses of between about 0.035 and 0.065 inches are being contemplated for use with nominal pipe sizes ("NPS") of up to at least three inches. The thinnest threaded steel pipe wall thickness permitted by standard ASTM schedules for fire sprinkler systems is believed to be 0.087 inches. The thinnest CPVC wall thickness permitted for fire sprinkler use is 0.085 inches for three-quarter inch nominal pipe size. For nominal pipe sizes of one inch or more, CPVC wall thickness must be more than 0.100 inches.

Piping and tubing are normally sized by specified outer diameters. The fittings with which they are used are internally sized in relation to the standard outer diameters specified for the piping and tubing to be received by the fittings. For standard fitting sizes, conduits 10 of the present system will have at least marginally larger inner diameters than would all plastic pipe and even standard steel pipe. For example, one-inch (NPS) Schedule 10 steel pipe, which is widely used for fire sprinkler systems, has an actual inner diameter of 1.097 inches and a wall thickness of 0.109 inches. Although this pipe is designed for roll grooving, it is sufficiently thick to be threaded. The thinnest steel pipe used in fire protection systems is Schedule 5. It is commercially available in nominal pipe sizes of between one and two inches. All have nominal wall thicknesses of 0.065 inches. Such thin-walled pipe is non-threadable. ASTM Designation: A795-93, "Standard Specification for . . . Steel Pipe for Fire Protection Use," sets forth schedules of Nominal Pipe Sizes, actual outer diameters and nominal wall thicknesses, for threadable Schedule 10 and 40 steel pipe, which are as follows:

TABLE

| NPS Designator | Outside Diameter (Inches) | Schedule 10 Nominal Wall Thickness (Inches) | Schedule 40 Nominal Wall Thickness (Inches) |
| --- | --- | --- | --- |
| ½ | 0.840 | — | 0.109 |
| ¾ | 1.050 | 0.083 | 0.113 |
| 1 | 1.315 | 0.109 | 0.133 |
| 1-¼ | 1.660 | 0.109 | 0.140 |
| 1-½ | 1.900 | 0.109 | 0.145 |
| 2 | 2.375 | 0.109 | 0.154 |
| 2-½ | 2.875 | 0.120 | 0.203 |
| 3 | 3.500 | 0.120 | 0.216 |
| 3-½ | 4.000 | 0.120 | 0.226 |
| 4 | 4.500 | 0.120 | 0.237 |
| 5 | 5.563 | 0.134 | 0.258 |
| 6 | 6.625 | 0.134 | 0.280 |

The wall thicknesses for CPVC pipe are similar to threadable steel pipe at the smallest nominal pipe sizes, e.g. 0.087 inch versus 0.085 inch for ½ inch (NPS) steel pipe and CPVC tubing, respectively. In all cases, the ferrous metal pipe of the multilayer conduit of the present invention will be thinner than the thinnest nominal wall thickness prescribed for the thinnest pipe of the same nominal diameter previously usable in fire protection systems.

Wall thickness requirements increase more quickly for CPVC ranging from 0.107 inch for one-inch diameter (NPS) tubing (1.101 inch actual inner diameter) to 0.300 inches for three inch diameter (NPS) tubing. It is expected that the increased inside diameter that can be provided by using the multilayer conduit 10 of the present invention with standard CPVC fittings would provide approximately 4% more water flow than conventional thin-walled steel pipe systems (less than Schedule 10) and 8% more water flow than traditional Schedule 10 and 40 steel pipe systems for approximately the same nominal pipe sizes. The increased capacity will be even greater in comparison to all-CPVC systems, particularly in sizes greater than one inch. This effective increase in inside diameter will, in some cases, permit a contractor to reduce pipe size for a sprinkling system, thereby saving additional labor and material for the contractor.

If the outer diameter of the multilayer conduit 10 is fixed by the inner diameter of the conventional fittings with which it is used, the outer diameters of the metal pipe 12 will depend upon the thicknesses of the thermoplastic and adhesive layers 20 and 22. As a result, the metal pipe of the present invention generally will be of non-standard outer and inner diameters.

The multilayer conduit 10 of the present invention has all of the fabrication advantages of all plastic piping. Multilayer conduit 10 of the present invention can be cut to any length in the field using common wheel cutters. The cut end is preferably deburred and the CPVC layer may be chamfered for ease of assembly. No threading or grooving or other disruption of the conduit ends or of the metal pipe in particular is required for joint formation. An ambient temperature acting bonding agent is simply applied around the end of the conduit 10 on the exposed thermoplastic layer 20 and/or on the exposed innermost surface of the fitting, which is formed by the exposed thermoplastic layer, receiving the end of the conduit. The pieces are joined by inserting the conduit end in the fitting open end and twisting to distribute the bonding agent. The resulting bonded joint will cure and be pressure supportive within minutes using the indicated preferred bonding agents. The thermoplastic outer layer 20 has the further advantage of protecting the outside of the metal pipe 12 from corrosion.

One step solvent cements produced by the IPS Corp. of Gardena, Calif., and the Oatey Company, Cleveland, Ohio, are the preferred ambient temperature acting bonding agents to join the above described CPVC coated conduits 10 and CPVC fittings 30 and provide joints which remain leak-proof and integral at pressures of at least 875 psi or more. The IPS formulation is known as Central Sprinkler CSC-300 Solvent Cement. It is also known as WELD-ON 723 (Modified for BLAZEMASTER® CPVC Pipe). The Oatey formulation is called "Oatey Medium Red BLAZEMASTER® Cement CPVC-Low VOC." These bonding agents are applied directly, without dilution and are suitable for use at ambient temperatures, i.e. at some temperature(s) between about 0° and 120° F. Each is described as a mixture of CPVC resin and organic solvents including tetrahydrofuran, methyl ethyl ketone, cyclohexanane and acetone. Each is applied without dilution and cures at room temperature (e.g. about 0—about 120° F.).

Figure 6:
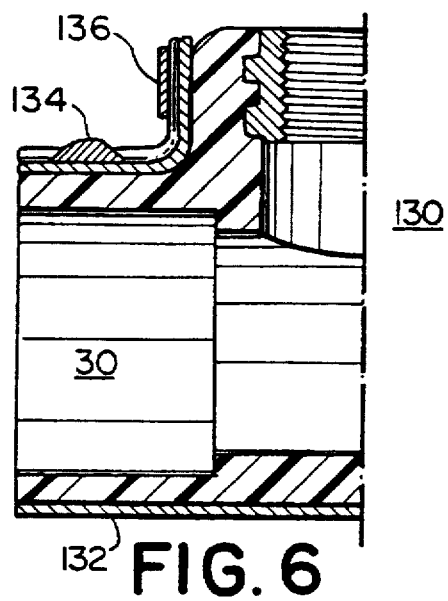
FIG. 6 is a quarter-section side elevation view of a multilayer metal/plastic, tee-shaped threaded adaptor fitting of the present invention for mating a conventional threaded fire sprinkler or nozzle in a multilayer conduit system like that of FIG. 3.
Figure 7:
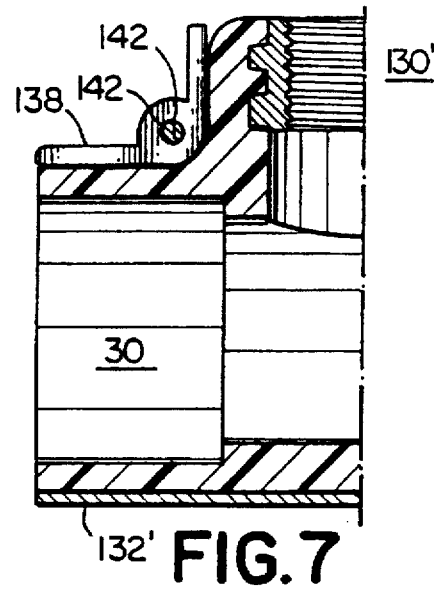
FIG. 7 depicts in quarter-section side elevation view, another exemplary fitting of the present invention with an alternate form of securement to the forms depicted in FIG. 6.
Figure 8:
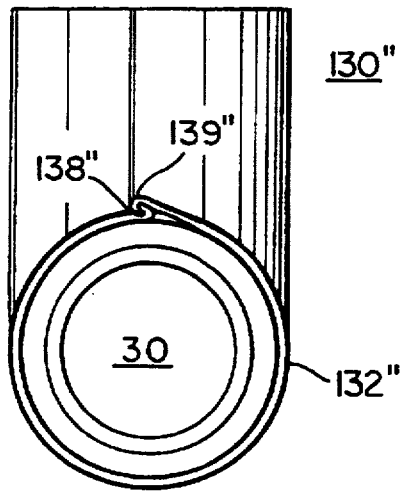
FIG. 8 depicts in end view yet another exemplary fitting of the present invention with an alternate form of securement to those depicted in FIGS. 6 and 7.

FIG. 6 depicts diagrammatically in a quarter-section view a multi-layer metal/plastic threaded sprinkler adaptor type tee shaped fitting of the present invention, indicated generally at 130, that can be used for increased thermal protection in higher challenge fire locations. The improved fitting 130 includes an inner, conventional thermoplastic, preferably CPVC fitting 30, such as fitting 30 of FIG. 2, and a surrounding metal shell indicated generally at 132. Metal shell 132 can be stamped, shaped and folded around the tee-shaped fitting 30 and secured about the fitting 30 by any of a variety of ways including, but not limited to, brazing indicated generally at 134 or banding indicated by band 136. Other forms of securement are shown in FIGS. 7 and 8. In FIG. 7, pairs of facing flanges (one being depicted at 138) are provided on a modified metal shell 132' of yet another fitting embodiment 130' with opening(s) 140 to receive a conventional fastener 142, which might be a rivet, screw or bolt portion of a nut and bolt combination. FIG. 8 is an end view of yet another fitting embodiment 130" in which outwardly turned and inwardly turned opposing flanges 138", 139" of metal shell 132" overlap one another and lock around the fitting 30. Each of shells 132, 132' and 132" provides a metal layer at least substantially entirely covering the otherwise outer surface of fitting 30 sufficiently to measurably improve the ability of the fitting 30 to withstand heat.

Figure 9:
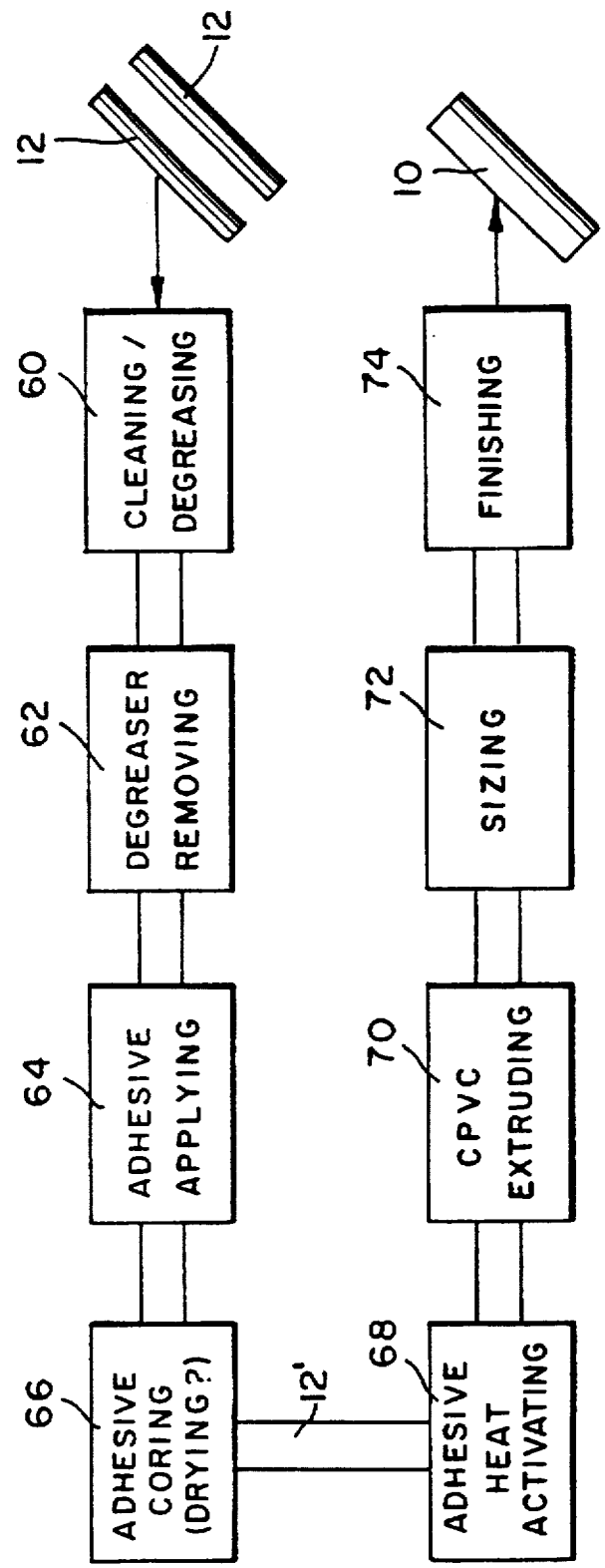
FIG. 9 is a schematic view of a process for manufacturing multilayer pipe according to the present invention.

FIG. 9 depicts in block diagram form, suggested steps for fabricating the multilayer conduit 10. Preferably, the thin-walled steel pipe 12 is provided preformed in individual, cut standard lengths. The steel pipe is cleaned of any residual scale and other contaminant(s) and degreased at step 60 and then cleaned of degreaser, for example, by forced air evaporation at step 62. Next, an appropriate adhesive material 24 is applied to the completely closed tubular outer surface 13 by any suitable means in an adhesive applying step 64. Spraying the entire outer surface of the metal pipe 12 is preferred but the adhesive material 24 may be brushed or rolled onto the pipe 12 or the pipe 12 may be dipped. The adhesive material 24 is then dried in a drying step 66. For the disclosed preferred adhesives, drying is preferably accomplished by heating at a temperature below the activation temperature, for example, about 150° F., to sufficiently eliminate solvent carriers from the adhesive to permit the pipe with adhesive coating or layer to be handled. The adhesive coated pipe will hereinafter be identified by reference numeral 12'. The pipe with adhesive material layer 12' can be dried by heating to a temperature as hot as the adhesive will permit without activating. This is about 340°–350° F. for The B. F. Goodrich adhesive but only about 250° F. for the Lord Co. system.

The pipe with adhesive coating 12' is passed through an extrusion head 88 as shown in FIG. 10. The preferred adhesive material layer 24 is preheated by a set of preheaters 85a, 85b, 85c and by the tooling of the head 88 to an activation temperature above the drying temperature, desirably above 350° F., in a heat activating step 68 just prior to application of the melted CPVC. The indicated adhesives are heated to about 360° F. or more for activation. The Lord Co. system can be heat activated at a temperature below 350° F., if desired. The adhesive 24 is preferably heat activated before physically entering the extrusion head 88 but could be heat activated within the head as well. By preheating the surface of the pipe 12' at the entrance to the head 88, the pipe 12' can still be handled from outside the head to advance it through the preheaters and the head. Preheating the pipe 12' helps to maintain the temperature of the extruded plastic. CPVC 21 or other extrudable thermoplastic is applied in a tubular layer 20 in an extruding step 70.

The multilayer conduit 10 can be moved through the extrusion head 88 in a variety of ways including pushing, pulling or, preferably, a combination of initially pushing and subsequently pulling, for example, using pinch wheels (not depicted).

The conduit 10 may be treated in a sizing step 72 in which the outside surface is finished to achieve a more exact and uniform sizing of the outer diameter of the CPVC layer 20 and conduit 10. The outer diameter of the conduit 10 is believed to be sizable in a number of ways which are standard for sizing plastic tubing including but not limited to mechanical rolling, vacuum sizing or a combination of such processes, as well as by positive air pressure as will be described with respect to FIG. 12.

If mechanically cut lengths of steel pipe 12 are fed sequentially into the extrusion head 88, the ends of such pipe would be slightly inwardly rolled or "dimpled" from the cutting process. This slight reduction in pipe diameter at the pipe ends is within normal manufacturing tolerances for such pipe. Although slight, the variation in dimension should be detectable by a proximity detector or the like with the pipes 12 butted end to end. Also, it would be possible to track the location of the pipe ends by providing an encoder or encoders on one or more servos controlling wheels feeding pipe through the extrusion head with a sensor or sensors which can detect the beginning and end of the pipe. Alternatively the pipes could be fed into the extrusion head with gaps between each pipe. A space of about 1/32" or more could be developed between adjoining ends of adjoining lengths of pipe, depending upon the method of feed. The space will be spanned by a continuous tube of the CPVC material, which should collapse between the pipes for lack of internal support to identify the pipe ends. Since these changes would be more pronounced than the rolled pipe ends, it is believed that other, different sensors (e.g. ultrasonic, magnetic, electric and/or optical means of detection) also can be used to locate the pipe ends exiting the extrusion head 88. The precut lengths of metal pipe 12 can thus be identified, separated from one another and the ends of the resulting multilayer conduits 10 cleaned of excess CPVC in a finishing step 74.

FIG. 10 depicts diagrammatically the major tooling components of a preferred extrusion head 88 for applying CPVC material to adhesive coated metal pipe 12'. A conventional extruder is partially depicted and indicated generally at 80. The extruder 80 includes a reservoir of CPVC which is heated and fed under pressure in a conventional manner through a coupling 82 into a feed conduit 86 of the head and into the extrusion head 88 itself. The CPVC passes through an opening 87a in a bushing 87 of the head 88 and into a compression chamber 96 defined between an inner tubular surface of bushing 87 and an outer surface of an extrusion pin 90. Extrusion pin 90 has a central bore 91 (in phantom) to receive and pass the adhesive coated metal pipe 12' and a feed channel 92 on its outer surface to receive CPVC from the feed conduit 86. The extrusion head 88 further includes a mandrel 94 supporting the pin 90 from its upstream end. If desired, the downstream end of the pin 90 can supported by a knife edge spider extended between the pin 90 and the bushing 87 or between a die 98 attached to the bushing 87 and the pin 90. The bushing 87 surrounds the proximal end of the pin 90 and the die 98 surrounding the distal end of the pin 90.

Feed channel 92 has two symmetric halves, one of which is indicated at 92a and is seen in FIG. 10. The hidden half is a mirror image on the other side of the pin 90. Both halves 92a, 92b are seen in phantom in FIG. 11, an end view of the pin 90. Each feed channel portion 92a, 92b spirals helically from opening 87a to an opposing side of the pin 90, 180° around the pin 90 away from the opening 87a. Preferably, the feed axis of the extruder 80 and the central axes of the coupling 82 and feed conduit 86 are coplanar with one another and with feed channels 92a, 92b to minimize stagnation and shear. Each feed channel portion 92a, 92b smoothly and progressively diminishes in cross-sectional area from an essentially true semi-circle directly adjoining opening 87a to no cross-sectional area, where the feed channel 92a and its mirror 92b meet on the opposite side of the pin 90 from opening 87a. The pin 90 includes a generally cylindrical portion 90a supporting the channel 92. Pin 90 is thereafter inwardly tapered down in a cone-shaped portion 90b to a second, smaller diameter cylindrical portion 90c, having a wall thickness of less than 0.1 inch and an inner diameter only about 60 mils larger than the outer diameter of the steel pipe 12. If desired a plurality of radially inwardly and longitudinally extending knife edges can be provided within the bore of pin 90 to help keep the pipe 12' centered as it feeds from the end of pin 90. The inner diameter of the bushing 87 below the channel 92 is about 0.3 inches greater than the diameter of the pin 90 immediately below the channel 92. This difference essentially defines the radial dimension of the annular compression chamber 96. The die 98 has a tapered portion 98a facing the tapered portion 90b of pin 90 and a uniform diameter bore 98b receiving the uniform diameter distal end 90c of pin 90. The uniform inner diameter bore 98b in die 98 might be, for example, about 0.09 to about 0.12 inches greater than the outer diameter of the extreme distal 90c of the pin 90 to extrude a tube of CPVC with a wall thickness of about 45 to 60 mils in order to apply about a forty mil thickness of CPVC or other thermoplastic to pipe 12'. The pipe 12' is passed through the extrusion head at a speed greater than the speed at which the CPVC compound is being extruded. Preferably, the speed is controlled to stretch the CPVC compound to approximately 40 mils, which is slightly less than the original extruded thickness.

To control the temperature of the CPVC compound, heating zones are maintained in or on the extrusion head tooling and elsewhere. Preferably separate, independently controlled heating zones are maintained on the coupling 82, the feed conduit 86, the head housing 84 above the bushing 87, and the bushing 87 itself below feed conduit 86. In addition, each of the preheaters 85a, 85b, 85c is preferably separately controlled upstream from the head 88 to preheat the pipe 12' and activate the adhesive coating 22 immediately prior to passing through the extrusion head 88. The extrusion head heat zones are preferably maintained at about 365° F. to permit some shear heating of the CPVC compound as it passes from the extruder 80 and through the head 88.

The orientation and progressive reduction in cross-sectional area of the channel portions 92b, 92a are very important to the success of the CPVC extruding step. Portion 92a and its mirror image counterpart 92b move resin more quickly to the opposite side of the pin 90 than the resin would have arrived there without the channel 92 to prevent uneven cooling of the resin circumferentially around the pin 90. The channel halves 92a, 92b lie in a common plane with the centerline of the feed conduit 86 and bushing opening 87a. The depth of each channel half 92a, 92b is reduced linearly as each channel half extends from the bushing opening 87a (0° position on the pin 90) to the opposite side of pin 90 (180° position). In addition, the cylindrical portion of the pin on the downstream side of the groove is further cut back from about halfway along each channel half 92a, 92b (i.e. about 90° and 270° positions) to the far side of the pin 90 (i.e. the 180° position), again generally linearly beginning at about each halfway position (i.e. about 90° and 270° positions) to a depth of about 0.090 inches at the opposite side (i.e. 180° position) of the pin 90. The generally uniform cooling of the melted CPVC is very important as it prevents the formation of a noticeable weld or knit line or a high stress concentration where such line might normally be located on the side of the pin 90 opposite opening 88a.

Preheating the adhesive coated pipe 12' to near the temperature of the extruded CPVC (e.g. within at least about 50° F. and preferably to within less than 50° F. of the temperature of the applied CPVC) assists in maintaining temperature of the CPVC compound in the extrusion head 88, in a preferred temperature processing range. In the extrusion head 88, that range is only about 15° F. (about 415° to about 430° F.). The preferred CPVC compound is resistive to being pulled to the preferred thinness due to its viscousness from chlorination. The preferred compound tends to tear if permitted to cool to 410° F. or below and tends to burn or gall if permitted to exceed about 450° F. If pulled too quickly through the tooling, the CPVC can be overheated by the friction and burn. The ideal temperature for discharging the CPVC would be just under or about 450° F. It is believed the above-described arrangement delivers CPVC compound to the pin 90 (or pipe 12') at about 430° F. One inch diameter pipe is currently being passed at a rate of about thirty to thirty-five feet per minute through the described tooling with the identified CPVC compound, steel pipe and heat activated adhesives.

Figure 12:
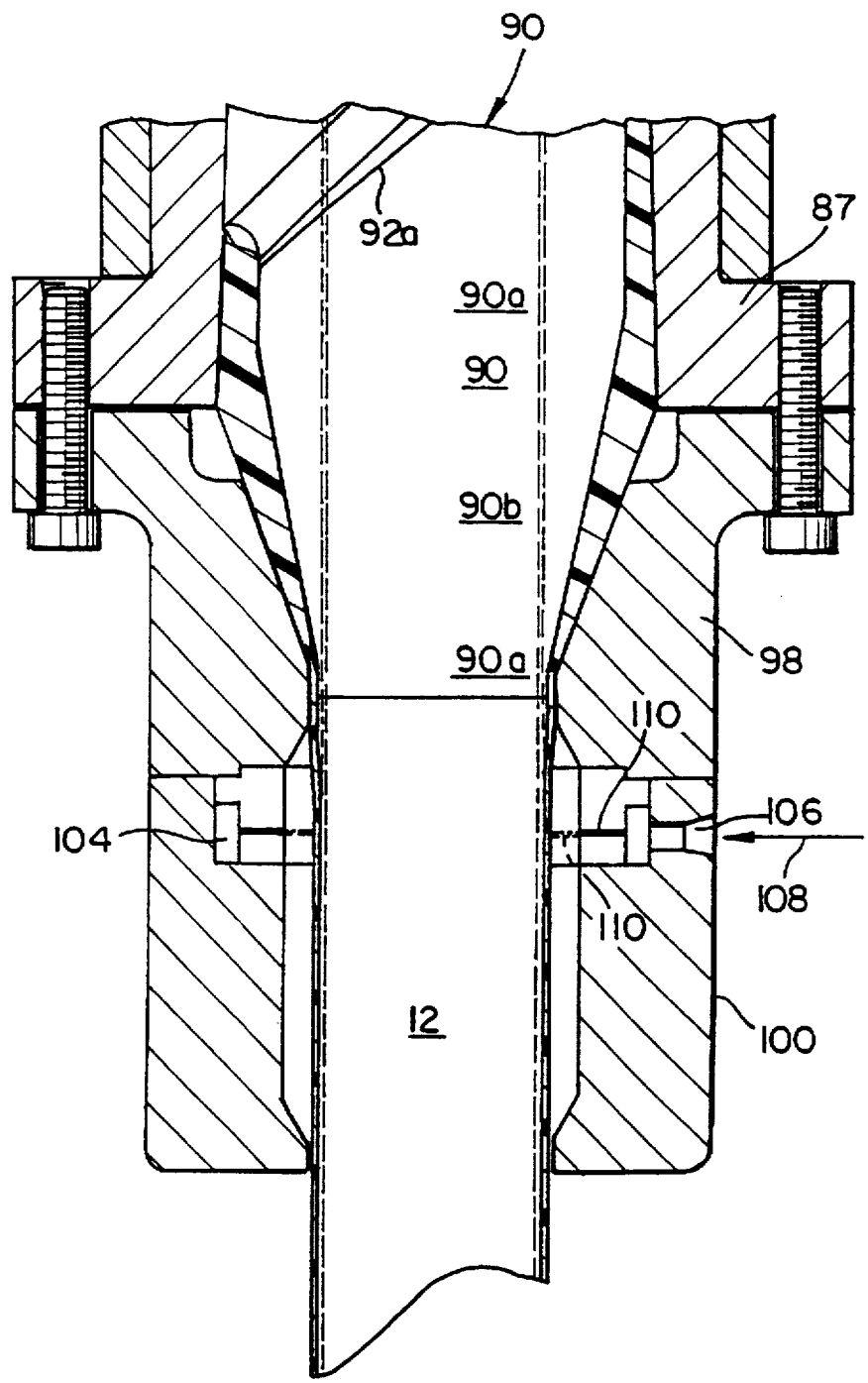
FIG. 12 depicts schematically the interior of an air sizing collar on the extrusion head.

FIG. 12 shows a proposed arrangement for sizing. A tubular sizing collar 100 is mounting in the exposed end of die 98. The collar includes an inner passageway 102 through which the plastic coated conduit 10 passes when exiting the die 98. An annular manifold 104 is provided within the collar coupled with a feed conduit 106 through which a pressurized source of air indicated by arrow 108 or other appropriate gas can be fed. A plurality of individual bores 110 extend radially inwardly from the manifold 104 into the inner passageway and define a ring of air jets which surround any conduit 10 passing through the extrusion head 88. Thickness of the thermoplastic layer 22 is controlled by a combination of operating parameters including feed rate of the pipe 10', feed rate and temperature of the CPVC compound or other extruded thermoplastic and pressure of the air or other gas blown through the bores 110.

The multilayer conduit and conduit systems of the present invention offer significant benefits in costs and ease of use over other known metal, plastic or composite metal/plastic conduit systems, particularly in fire protection systems. The preferred multilayer conduit of the present invention provides greater strength and greater rigidity at reduced wall thickness than can be provided by all plastic piping. The multilayer conduit of the present system invention can be coupled together into systems as easily as all plastic systems without the fire danger or cost associated with installing brazed copper systems or the expense of installing all steel systems. The multilayer conduit of the present system permits the installation of conduit systems with less skilled labor and without the expense of threading equipment, flaring equipment, torches, thermal bonding or crimping equipment or other expensive, mechanical fitting coupling systems.

Because the present system does not require the provision of threads or other disruptions in the inner and outer tubular surfaces of the ferrous metal pipe 12 or the multilayer conduit 10 or the compression of the ends of the pipe or conduit, steel piping thinner than steel piping ever known to have been previously used in such systems can now be used for light weight and cost savings while still providing the rigidity of metal with full integrity to pressures of 875 psi and more. The conduit of the present invention is expected to be the first conduit system employing plastic, which is designed for use in ordinary hazard occupancies as defined by National Fire Protection Association (NFPA) 13. However, it is believed that the advantages of the preferred composite system will lead to much greater acceptance and use in light hazard systems where all metal piping presently predominates in installed fire protection systems. In particular, it is expected that the hanger requirements for the preferred composite conduit 10 of the present invention will be at least as favorable as steel (maximum spacing of fifteen feet between supports). Because of its greatly reduced weight, conduit of the present invention should be able to be safely spaced at greater distances between supports (e.g. sixteen feet up to possibly twenty feet) to further reduce the installation cost while permitting greater installation flexibility.

The multilayer conduit of the present invention has the advantage of being able to be used with a host of existing CPVC fittings and, through those fittings, being coupled to other copper, steel and traditional plastic (e.g. PVC, ABS, etc.) conduit systems and piping.

While preferred embodiments of the invention have been disclosed and certain modifications thereto suggested, still other modifications and changes will occur to those of ordinary skill in the art. For example, while CPVC is preferred for the fittings and adhered CPVC is preferred for the conduits for sprinkler systems, other polymers might be used. Other extrudable, adherable, ambient temperature bondable polymers which might be used include, in addition to CPVC, polyvinyl chloride (PVC), acrylonitrilebutadienestyrene (ABS), polyurethanes (both polyesters and polyethers), and blends thereof with one another and with CPVC. All are extrudable, adherable to metal and solvent bondable. In distinguishing between PVC and CPVC, any PVC polymer more than 57% by weight chlorine is considered a chlorinated PVC.

The preferred CPVC thermoplastic layer complements the preferred steel pipe in other ways. The preferred CPVC is quite strong itself. The CPVC outer layer 22 protects the steel pipe 12 from external corrosion. Since such piping is dry or contains standing (non-flowing) water until activated, little internal corrosion typically occurs in such systems. Thus, even thinner steel wall can be used for fire protection than for other, more active (fluid flowing) conduit systems. Other polymers might be used with ferrous metal or with other metal pipes previously threaded for uses other than fire protection.

The invention is not limited to the specific preferred embodiments and alternate embodiments disclosed, but is intended to cover all embodiments set forth in the appended claims.

We claim:

1. A multilayer fluid conduit system comprising:
 a hollow conduit formed by a hollow length of metal pipe having a pair of opposing open ends defined by a completely closed tubular outer surface, the open ends of the metal pipe defining open ends of the conduit, a layer of thermoplastic completely covering the tubular outer surface of the metal pipe, and an adhesive layer between the metal pipe and the thermoplastic layer distributed to provide a circumferential leak-proof seal between the metal pipe and the thermoplastic layer at least at the open ends of the conduit;
 a fitting mounted on one open end of the conduit, the fitting including at least one open end receiving and overlapping the one open end of the conduit, the one open end of the fitting having an exposed, innermost tubular surface of thermoplastic directly facing and bonded to the thermoplastic layer on the one open end of the conduit so as to form a leak-proof sealed joint at the one end of the conduit directly between the conduit and the fitting.

2. The conduit system of claim 1 wherein the metal pipe has a tubular inner surface and wherein the tubular outer and inner surfaces of the metal pipe are uniformly smooth from end to end of the metal pipe.

3. The conduit system of claim 1 wherein the material of the metal pipe is steel.

4. The conduit system of claim 1 wherein the metal pipe has a wall thickness insufficient to support threads.

5. The conduit system of claim 1 wherein the metal pipe has a wall thickness less than 0.08 inches.

6. The conduit system of claim 5 wherein the metal pipe has a wall thickness of about 0.06 inches or less.

7. The conduit system of claim 6 wherein the metal pipe has a wall thickness of about 0.04 inches.

8. The conduit system of claim 1 wherein the metal pipe has a wall thickness of less than 0.08 inches in nominal pipe sizes up to three inches.

9. The conduit system of claim 1 wherein the conduit thermoplastic layer has a wall thickness of less than 0.08 inch.

10. The conduit system of claim 1 wherein the conduit thermoplastic layer has a wall thickness of about 0.04 inch.

11. The conduit system of claim 1 wherein the conduit thermoplastic layer has a wall thickness of between about 0.02 inch and 0.075 inch.

12. The conduit system of claim 11 wherein the metal pipe has a wall thickness less than 0.08 inch.

13. The conduit system of claim 11 wherein the metal pipe has a wall thickness of up to 0.06 inches.

14. The conduit system of claim 11 wherein the metal pipe has a wall thickness of about 0.04 inch.

15. The conduit system of claim 11 wherein the metal pipe has a wall thickness of between about 0.035 and about 0.065 inch.

16. The conduit system of claim 15 wherein the tubular outer and inner surfaces of the metal pipe at the ends of the conduit lack surface variations which would enable interference engagement with a mating fitting.

17. The conduit system of claim 1 wherein the adhesive layer bonds the thermoplastic layer with the metal pipe only after being heated to a temperature above 300° F.

18. The conduit system of claim 1 wherein the adhesive layer completely encircles the tubular surface of the metal pipe and extends along the metal pipe sufficiently from ends of the metal pipe to form an unbroken annular waterproof seal between the metal pipe and the thermoplastic layer.

19. The conduit system of claim 1 wherein the thermoplastic layer of the conduit comprises CPVC.

20. The system of claim 19 wherein the thermoplastic layer of the conduit consists essentially of CPVC.

21. The system of claim 19 wherein the innermost surface of the fitting comprises CPVC.

22. The system of claim 21 wherein the innermost surface of the fitting consists essentially of CPVC.

23. The system of claim 20 wherein the innermost surface of the fitting consists essentially of CPVC.

24. The system of claim 20 wherein the innermost surface of the fitting comprises CPVC.

25. The system of claim 23 wherein the one open end of the conduit and the one end of the fitting each lack structure which provides interference engagement to couple the conduit with the fitting.

26. The system of claim 1 wherein the fitting further includes an outer metal layer at least substantially entirely covering the fitting.

27. The system of claim 1 further comprising an automatic fire sprinkler fluidly coupled with the fitting.

28. The system of claim 1 further comprising a fire nozzle fluidly coupled with the fitting.

29. The system of claim 1 wherein the wall thickness of the metal pipe and the wall thickness of the thermoplastic layer of the conduit is each less than 0.08 inches.

30. The system of claim 29 wherein the combined wall thickness of the metal pipe and the thermoplastic layer of the conduit is up to 0.10 inches.

31. The conduit system of claim 1 further comprising:

an ambient temperature acting bonding agent between the thermoplastic material layer on the conduit and the exposed, innermost tubular surface of the fitting effective to form a leak-proof sealed joint encircling the one end of the conduit directly between the conduit and the fitting.

32. A method for making the fluid conduit system of claim 1 from the fitting and the hollow conduit, comprising the steps of:

applying an ambient temperature acting bonding agent to at least one of the thermoplastic material layer exposed on the one open end of the conduit and the exposed, innermost tubular surface of the fitting; and maintaining the conduit and the fitting together with the tubular open end of the fitting receiving and covering the one end of the conduit until the bonding agent forms the leak-proof sealed joint directly between the conduit and the fitting encircling the one end of the conduit.

33. A method for making the fluid conduit of claim 27 system from the fitting and the hollow conduit, comprising the steps of:

applying an ambient temperature acting bonding agent to at least one of the thermoplastic material layer exposed on the one open end of the conduit and the exposed, innermost tubular surface of the fitting; and maintaining the conduit and the fitting together with the tubular open end of the fitting receiving and covering the one end of the conduit until the bonding agent forms the leak-proof sealed joint directly between the conduit and the fitting encircling the one end of the conduit.

* * * * *